(12) United States Patent
Kim et al.

(10) Patent No.: US 7,859,632 B2
(45) Date of Patent: Dec. 28, 2010

(54) DISPLAY DEVICE WITH WIDE AND NARROW VIEWING ANGLE MODES

(75) Inventors: Sung-Woon Kim, Suwon-si (KR); Se-Hwan Yu, Asan-si (KR); Sung-Tae Shin, Seongnam-si (KR); Hee-Seop Kim, Hwasung-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 215 days.

(21) Appl. No.: 12/027,748

(22) Filed: Feb. 7, 2008

(65) Prior Publication Data
US 2008/0273134 A1    Nov. 6, 2008

(30) Foreign Application Priority Data
May 3, 2007   (KR) ...................... 10-2007-0043167

(51) Int. Cl.
G02F 1/1343 (2006.01)
C09K 19/02 (2006.01)

(52) U.S. Cl. .................. 349/144; 349/141; 349/177
(58) Field of Classification Search .............. 349/141, 349/144, 177
See application file for complete search history.

(56) References Cited

U.S. PATENT DOCUMENTS

2007/0108408 A1* 5/2007 Kumar ................. 252/299.61
2007/0121047 A1* 5/2007 Chung et al. ................. 349/141

* cited by examiner

Primary Examiner—Michael H Caley
(74) Attorney, Agent, or Firm—Innovation Counsel LLP

(57) ABSTRACT

A display device includes a first substrate, a second substrate facing the first substrate, first to third electrodes formed on the first substrate, and a fourth electrode formed on the second substrate, wherein the first and second substrates include a main display region and an assistance display region, wherein the first and second electrodes form a horizontal electric field that is substantially parallel to the surfaces of the first and the second insulating substrates, and the third and fourth electrodes form a vertical electric field that is substantially perpendicular to the surfaces of the first and second substrates.

9 Claims, 8 Drawing Sheets

DISPLAY DEVICE WITH WIDE AND NARROW VIEWING ANGLE MODES

CROSS-REFERENCE TO RELATED APPLICATION

This application claims priority to and the benefit of Korean patent application no. 10-2007-0043167 filed in the Korean intellectual property office on May 3, 2007, the entire contents of which are incorporated herein by reference.

BACKGROUND OF THE INVENTION

1. Field of the Invention

The present invention relates to a liquid crystal display.

2. Description of the Related Art

A liquid crystal display (LCD), a plasma display panel (PDP), a flat emission display (FED), a vacuum fluorescent display (VFD), and an organic light emitting device (OLED) are among widely used flat panel displays. An LCD includes two panels provided with field-generating electrodes such as pixel electrodes and a common electrode, and a liquid crystal (LC) layer interposed therebetween. The LCD displays images by applying voltages to the field-generating electrodes to generate an electric field in the LC layer which determines orientations of LC molecules in the LC layer and adjusts the polarization of incident light.

The LCD has a characteristic that viewing angle and contrast ratio change with the viewing angle, maximum luminance being displayed at a position that is perpendicular to the surface of the screen and is gradually reduced as the viewing angle increases. A reference viewing angle is defined as the viewing angle that makes the contrast ratio equal to a reference value. It is preferable that a wide reference viewing angle be obtained so as to permit viewing of normal images at a wider angle.

Particularly, when simultaneously displaying images to many viewers, normal images having a contrast ratio equal to or greater than the reference value must be displayed from the side angle as well as from the front. For these reasons.

However, for inputting personal information in a public environment, drafting or perusing secret documents, or executing preservation work, LCDs having a narrow viewing angle must be provided, as well as those with a wide viewing angle.

SUMMARY OF THE INVENTION

In accordance with an aspect of the present invention a liquid crystal display is provided having, selectively, either a wide viewing angle or a narrow viewing angle.

An exemplary display device is provided which includes a first substrate, a second substrate facing the first substrate, first to third electrodes formed on the first substrate, and a fourth electrode formed on the second substrate. The first and second substrates include a main display region and an assistance display region, wherein the first and second electrodes form a horizontal electric field that is substantially parallel to the surfaces of the first and second substrates, and the third and fourth electrodes form a vertical electric field that is substantially perpendicular to the surfaces of the first and second substrates.

The display device may further include a liquid crystal layer formed between the first and second substrates.

The liquid crystal layer may be a biaxial nematic layer.

Biaxially nematic liquid crystal molecules of the liquid crystal layer may include a first portion having a first major axis and a second portion having a second major axis.

The display device may further include a first polarizer formed on the surface of the first substrate and a second polarizer formed on the surface of the second substrate, wherein the transmission axis of the first polarizer crosses the transmission axis of the second polarizer, the transmission axis of the first polarizer is parallel to the first major axis, and the transmission axis of the second polarizer is parallel to the second major axis.

The transmission axis of the first polarizer may form an angle in a range of 0-90 degrees with the horizontal electric field.

The first portion may have positive dielectric anisotropy, and the second portion may have negative dielectric anisotropy.

The liquid crystal layer is a uniaxial nematic layer.

The display device may further include a first polarizer formed on the surface of the first substrate and a second polarizer formed on the surface of the second substrate, wherein the transmission axis of the first polarizer crosses the transmission axis of the second polarizer, and the major axis of the uniaxial nematic liquid crystal molecules of the liquid crystal layer is initially aligned parallel or perpendicular to the transmission axis of the first polarizer.

The uniaxial nematic liquid crystal molecules of the liquid crystal layer may have positive dielectric anisotropy or negative dielectric anisotropy.

The first and second electrodes may be pixel electrodes and the third and fourth electrodes may be common electrodes, and the first and second electrodes may be switched by thin film transistors.

The first and third electrodes may be pixel electrodes, the second and the fourth electrodes may be common electrodes, the first electrode may be switched by a thin film transistor, and the third electrode may be switched by a controlling viewing angle line.

A display device is provided, which includes a first panel including field generating electrodes formed in a main display region and a first control electrode formed in an assistance display region, a second panel including color filters facing the field generating electrodes and a second control electrode facing the first control electrode, and a liquid crystal layer formed between the first and second panels, wherein the first and second control electrodes form an electric field that is perpendicular to the surfaces of the first and second panels.

The main display region may include at least three pixels having three primary colors, and the assistance display region may include at least one pair of a first and a second control electrode.

The display device may further include a first polarizer formed on the surface of the first panel and a second polarizer formed on the surface of the second panel, wherein the transmission axis of the first polarizer crosses the transmission axis of the second polarizer, and the liquid crystal layer has one major axis initially aligned parallel to the transmission axis of the first polarizer.

The liquid crystal molecules may include a first portion having a first major axis and a second portion having a second major axis that is perpendicular to the first major axis.

The liquid crystal molecules may be initially aligned parallel to the surfaces of the first and second panels.

The display device may further include a first polarizer formed on the surface of the first panel and a second polarizer formed on the surface of the second panel, wherein the transmission axis of the first polarizer crosses the transmission axis of the second polarizer, the transmission axis of the first polarizer is parallel to the first major axis, and the transmission axis of the second polarizer is parallel to the second major axis.

The first portion may have positive dielectric anisotropy, and the second portion may have negative dielectric anisotropy.

The first portion in the main display region may be arranged to be parallel to the generated electric field, the second portion in the main display region may be arranged to be perpendicular to the generated electric field, the first portion in the assistance display region may be arranged to be perpendicular to the generated electric field, and the second portion in the assistance display region may be arranged to be parallel to the transmission axis of the second polarizer.

BRIEF DESCRIPTION OF THE DRAWINGS

The present invention will become more apparent by describing embodiments thereof in detail with reference to the accompanying drawings, in which.

DETAILED DESCRIPTION

Figure 1:
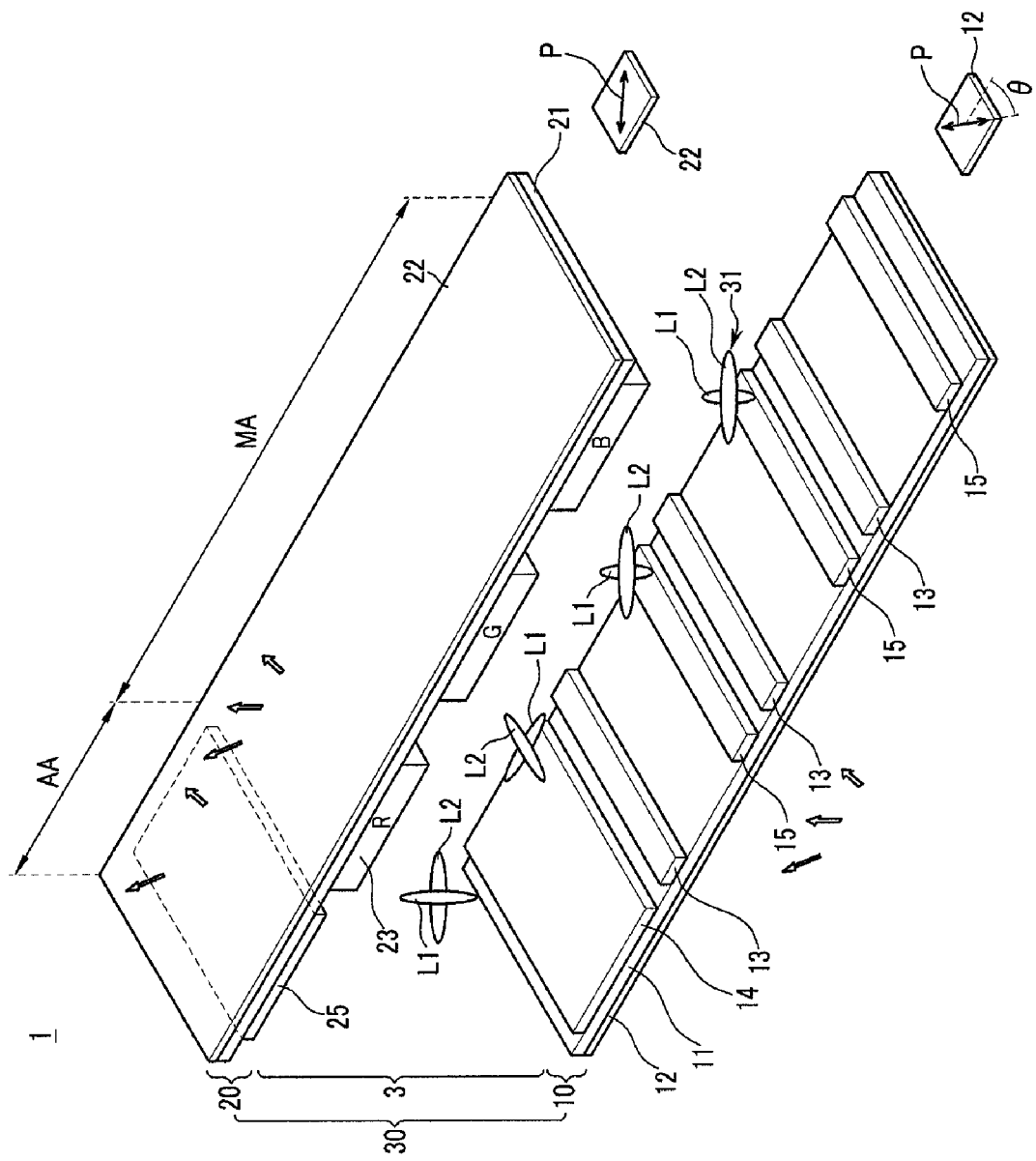
FIG. 1 is a perspective view of a display device according to an embodiment of the present invention.

The present invention will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films, and regions are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A display device according to an embodiment of the present invention will be described in detail with reference to FIG. 1.

FIG. 1 is a perspective view of a display device according to an embodiment of the present invention.

A display device 1 includes a panel assembly 30 having a first panel 10, a second panel 20, and a liquid crystal layer 3 formed between the first and second panels 10 and 20.

The exemplary panel assembly 30 is adjusted for a liquid crystal display, but this is provided to explain the present invention, and the present invention should not be construed as limited to the embodiments set forth herein.

The first panel 10 includes a lower substrate 11, and first to third electrodes 13, 15, and 14 formed on one surface of the lower substrate 11. A lower polarizer 12 is formed on the other surface of the lower substrate 11. The transmission axis P of the lower polarizer 12 forms a predetermined angle θ with reference to the direction crossing the length direction of the first and second electrodes 13 and 15.

A pixel includes at least one pair of a first and a second electrode 13 and 15, and the first and second electrodes 13 and 15 are extended in parallel to each other. At least three pixels respectively including the first and second electrodes 13 and 15 form a main display region MA. At least one third electrode 14 having a greater area than the first or second electrodes 13 and 15 forms one pixel, and the pixel forms an assistant display region AA.

The second panel 20 is disposed to face the first panel 10 with a gap therebetween. The second panel 20 includes the upper substrate 21, a plurality of color filters 23 formed on one surface of the upper substrate 21, and a fourth electrode 25. Each of the color filters 230 may represent one of the primary colors such as red, green, and blue, or yellow, cyan, and magenta, and faces the pair of the first and second electrodes 13 and 15. The fourth electrode 25 faces the third electrode 14, and a color filter such as a red, green, blue, yellow, cyan, or magenta filter may be formed between the fourth electrode 25 and the upper substrate 21. This embodiment is provided without a color filter therebetween. An upper polarizer 22 is formed on the other surface of the upper substrate 21, and the transmission axis of the upper polarizer 22 is perpendicular to the transmission axis of the lower polarizer 12.

In FIG. 1, one main display region MA defined by the three pixels each including a pair of a first and a second electrode 13 and 15, and one assistance display region AA defined by one pixel including the third electrode 14, are respectively shown, but the display device 1 according to the embodiment of the present invention may include a plurality of main display regions and a plurality of assistance regions AA.

The liquid crystal layer 3 is filled in the gap between the first and second panels 10 and 20, and liquid crystal molecules 31 of the liquid crystal layer 3 include a first portion L1 and a second portion L2 that are biaxially nematic.

The liquid crystal molecules 31 form cross shapes such that the first major axis of the first portion L1 and the second major axis of the second portion L2 are crossed with each other, and include one axis where the first and second major axes are crossed and perpendicular to the first and second major axes.

The liquid crystal molecules 31 are initially aligned in a direction parallel to the surfaces of the first and second panels 10 and 20. The first portions L1 of the liquid crystal molecules 31 are initially aligned in the same direction as the transmission axis of the lower polarizer 12, and the second portions L2 of the liquid crystal molecules 31 are initially aligned in the same direction as the transmission axis of the upper polarizer 22.

The first portions L1 and the second portions L2 of the liquid crystal molecules 31 may all have the same dielectric anisotropy, and may respectively have different anisotropy such as positive and negative. In the embodiment according to the present invention, the first portions L1 have positive dielectric anisotropy and the second portions L2 have negative dielectric anisotropy.

In FIG. 1, upon the application of an electric voltage between the first electrode 13 and the second electrode 15 in the pixel corresponding to the red color filter 23 among the main display region MA, the resultant electric field is substantially parallel to the surfaces of the panels 10 and 20. The first portions L1 of the liquid crystal molecules 31 are rearranged to be parallel to the horizontal electric field, and the second portions L2 of the liquid crystal molecules 31 are rearranged to be perpendicular to the horizontal electric field. On the other hand, when the electric fields are applied in the pixel corresponding to the green and blue color filters 23 among the main display region MA, the liquid crystal molecules 31 are maintained with initial alignment states. As a result, the phase retardation of the light is such that the light is transmitted, and accordingly the red color is displayed in the main display region MA.

The first portions L1 of the liquid crystal molecules 31 in the assistance region AA are vertically rearranged according to the vertical electric field between the third electrode 14 and the fourth electrode 25 with reference to the surfaces of the panels 10 and 20. Also, the second portions L2 of the liquid crystal molecules 31 in the assistance region AA are vertically rearranged according to the vertical electric field and parallel to the transmission axis of the upper polarizer 22.

Accordingly, because there is no phase retardation of the light proceeding vertically to the front side of the second panel 20 and parallel to the first portions L1 of the liquid crystal molecules 31, the light vertically passing the lower polarizer 12 and the liquid crystal layer 31 is blocked by the upper polarizer 22 having a transmission axis that is perpendicular to the transmission axis of the lower polarizer 12. On the other hand, because the light proceeding obliquely to the front side of the second panel 20 obliquely passes to the first portions L1 of the liquid crystal molecules 31, the phase of the light is retarded. Accordingly, the portion of the light polarized by the lower polarizer 12 passes the upper polarizer 22. In this way, the light passing the assistance display region AA in an oblique direction overlaps the light passing the main display region MA in an oblique direction. Accordingly, the lateral visibility of the display device is decreased. That is to say, upon the application to the electric voltage in the assistant display region AA, the images displaying in the main display region MA can be regularly visible at the front side of the display device, but the images displaying in the main display region MA are overlapped with the images of the assistance display region AA and are distorted at the oblique side of the display device. Accordingly, a narrow viewing angle may be obtained.

However, in the absence of the electric voltage applied to the assistance region AA, because the first portions L1 and the second portions L2 of the liquid crystal molecules 31 are respectively parallel to the transmission axis of the lower and upper polarizers 12 and 22, the light that is polarized by the lower polarizer 12 is blocked by the upper polarizer 22 irrespective of the front light and oblique light. Accordingly, the assistant display region AA becomes black, and the image of the main display region MA is not distorted. Therefore, a wide viewing angle may be obtained.

In brief, the user may selectively use the narrow viewing angle or the wide viewing angle by controlling the operation of the assistance display region AA in the embodiment according to an aspect of the present invention.

The operation of the display device 1 shown in FIG. 1 according to an embodiment of the present invention will be described in detail with reference to FIGS. 2a and 2b.

Figure 2A:
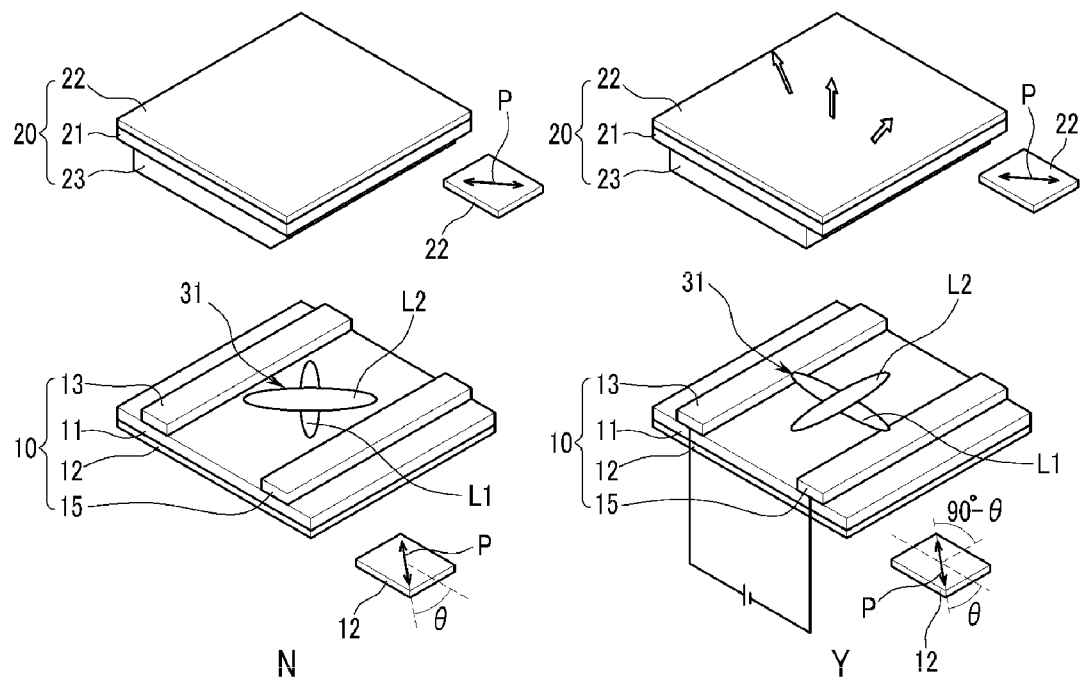
FIGS. 2a and 2b are views showing the arrangements of biaxial nematic liquid crystal molecules depending on application and non-application of an electric field in the display device of FIG. 1.
Figure 2B:
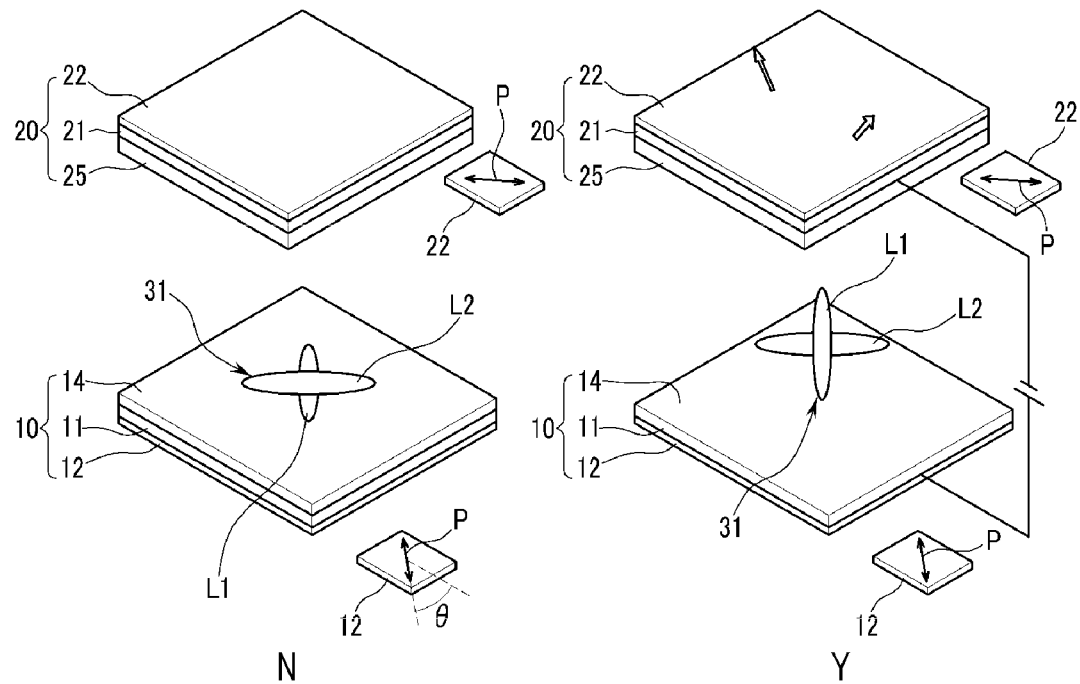

FIGS. 2a and 2b are views showing the arrangements of biaxial nematic liquid crystal molecules depending on application and non-application of the electric field in the display device of FIG. 1.

The arrangements of biaxial nematic liquid crystal molecules 31 depending on application and non-application of the electric field in the main display region MA of one pixel of the display device shown in FIG. 1 are shown in FIG. 2a, and the arrangements of biaxial nematic liquid crystal molecules 31 depending on application and non-application of the electric field in the assistance display region AA of one pixel of the display device shown in FIG. 1 are shown in FIG. 2b.

As show in FIGS. 2a and 2b, the transmission axis P of the lower polarizer 12 forms a predetermined angle θ with reference to the direction perpendicular to the length direction of the first and second electrodes 13 and 15, and is perpendicular to the transmission axis P of the upper polarizer 22. The color filter 23 is formed on the substrate 21 of FIG. 2a, but a color filter is not formed on the substrate 21 of FIG. 2b as one embodiment. However, a color filter may be formed on the substrate 21 of FIG. 2b. Also, the elements not mentioned in FIGS. 2a and 2b have the same structures as those of FIG. 1.

Referring to FIG. 2a, when no electric voltage is applied, the biaxial nematic liquid crystal molecules 31 are arranged to be parallel to the surfaces of the first and second substrates 11 and 21. Also, the first portions L1 of the liquid crystal molecules 31 are arranged to be parallel to the transmission axis P of the lower polarizer 12, and the second portions L2 of the liquid crystal molecules 31 are arranged to be parallel to the transmission axis P of the upper polarizer 22, perpendicular to the transmission axis P of the upper polarizer 22. Accordingly, the light passing to the lower polarizer 12 does not generate the phase retardation due to the first portions L1 and the second portions L2 of the liquid crystal molecules 31 that are arranged to be parallel and perpendicular to the transmission axis P of the lower polarizer 12. Accordingly, the polarized light is blocked by the upper polarizer 22 such that the pixel becomes black.

On the other hand, when an electric voltage is applied between the first electrode 13 and the second electrode 15, the horizontal electric field is formed to be substantially parallel to the surfaces of the first and second substrates 11 and 21. Accordingly, the first portions L1 of the liquid crystal molecules 31 are rearranged to be parallel to the electric field, and the second portions L2 of the liquid crystal molecules 31 are rearranged to be perpendicular to the electric field. Therefore, the first portions L1 and the second portions L2 of the liquid crystal molecules 31 respectively form an angle of 90-θ with the transmission axis of the lower polarizer 12 such that the light passing the lower polarizer 12 generates the phase retardation. As a result, the pixel displays a white state and the light passes the upper polarizer 22 in the front and oblique directions.

Referring to FIG. 2b, in the case N of non-application of the electric voltage, the biaxial nematic liquid crystal molecules 31 are arranged to be parallel to the surfaces of the first and second substrates 11 and 21. Also, the first portions L1 of the liquid crystal molecules 31 are arranged to be parallel to the transmission axis P of the lower polarizer 12, and the second portions L2 of the liquid crystal molecules 31 are arranged to be parallel to the transmission axis P of the upper polarizer 22, perpendicular to the transmission axis P of the upper polarizer 22. Accordingly, the light passing to the lower polarizer 12 does not have phase retardation due to the first portions L1 and the second portions L2 of the liquid crystal molecules 31 that are arranged to be parallel and perpendicular to the transmission axis P of the lower polarizer 12. Accordingly, the polarized light is blocked by the upper polarizer 22 such that the pixel becomes black.

On the other hand, when an electric voltage is applied between the third electrode 14 and the fourth electrode 25, the electric field is formed to be substantially perpendicular to the surfaces of the first and second substrates 11 and 21. Accordingly, the first portions L1 of the liquid crystal molecules 31 are rearranged to be parallel to the electric field, and the second portions L2 of the liquid crystal molecules 31 are rearranged to be perpendicular to the electric field and parallel to the transmission axis of the upper polarizer 22.

Therefore, the phase of the light passing the lower polarizer 12 is not retarded due to the first portions L1 being parallel to the electric field and the second portions L2 being parallel to the transmission axis P of the upper polarizer 22. Accordingly, the light passing the lower polarizer 12 is blocked by the upper polarizer 22 at the front direction. However, the portion elements of the light obliquely passing the lower polarizer 12 (hereinafter called "oblique light") form the predetermined angle with the longitudinal axis of the first portion L1 of the liquid crystal molecules 31 retarded in phase by the oblique light. Accordingly, the light obliquely passing the lower polarizer 12 passes the upper polarizer 22 in the oblique direction in the assistance display region AA. That is to say, when the electric field is applied, the black state is displayed in the front direction and the white state is displayed in the oblique direction.

Again referring to FIG. 1 based on this operation principle, the pixels having the green and blue color filters 23 are blacked without the application of the electric voltage in the main display region MA, and the pixel having the red color filter 23 is in a white state upon the application of the electric voltage. In the assistance display region AA, the black state is displayed in the front direction and the white state is displayed in the oblique direction when an electric field is applied.

Accordingly, because the light passing the assistance display region AA in the oblique direction overlaps the light passing the main display region MA in the oblique direction, the lateral visibility of the display device is decreased.

That is to say, the narrow viewing angle may be obtained upon the application of the electric voltage in the assistant display region AA. On the other hand, when no electric voltage is applied in the assistance region AA, the assistant display region AA becomes completely black and the image of the main display region MA is not distorted in the oblique direction. Therefore, the images may be regularly displayed in the main display region MA.

In brief, the display device according to the present invention may be selectively used as a narrow viewing angle of a wide viewing angle display device by controlling the operation of the assistance display region AA.

In the above description, the biaxial nematic liquid crystal molecules are used, but uniaxial nematic liquid crystal molecules may be used, and this will be described in detail with reference to the drawings.

Figure 3A:
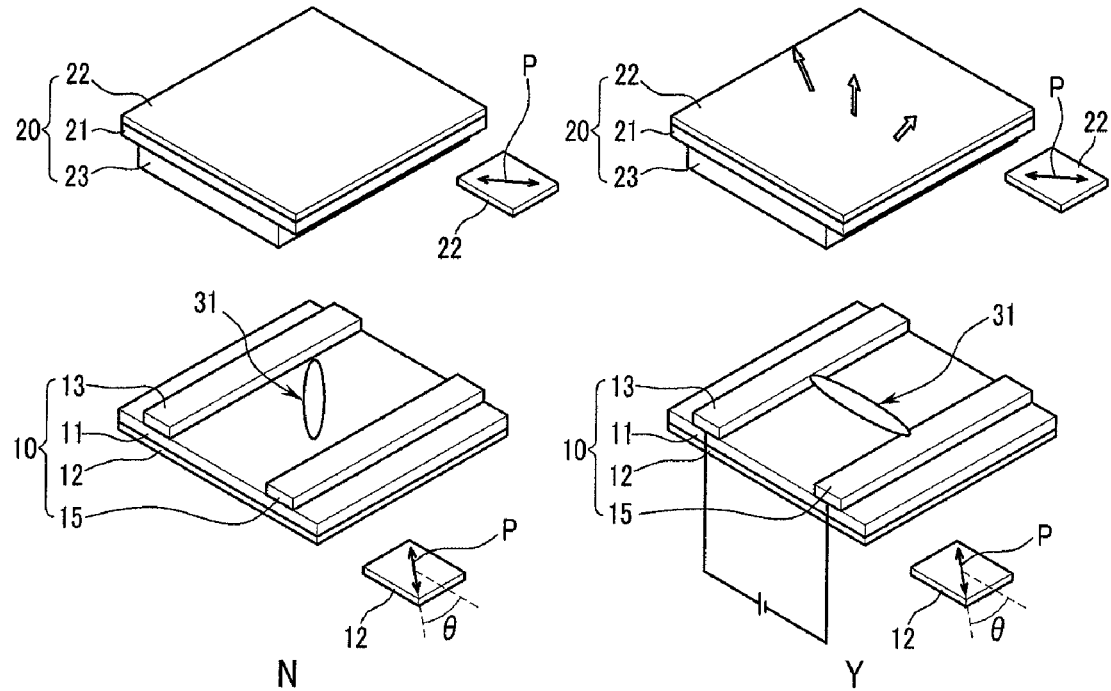
FIGS. 3a and 3b are views showing the arrangements of uniaxial nematic liquid crystal molecules depending on application and non-application of an electric field in the display device of FIG. 1.
Figure 3B:
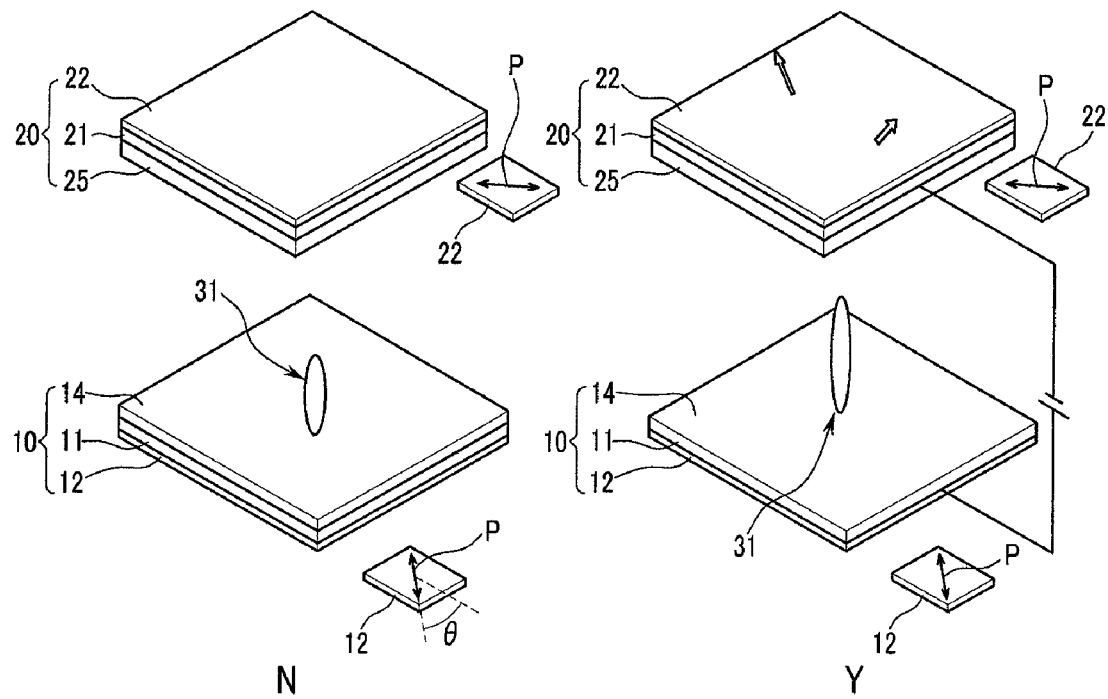

FIGS. 3a and 3b are views respectively showing the arrangements of uniaxial nematic liquid crystal molecules depending on application and non-application of an electric field in the main display region MA and the assistance display region AA of the display device of FIG. 1.

Referring to FIGS. 3a and 3b, the transmission axis P of the lower polarizer 12 forms a predetermined angle θ with reference to the direction perpendicular to the length direction of the first and second electrodes 13 and 15, and is perpendicular to the transmission axis P of the upper polarizer 22. The color filter 23 is formed on the substrate 21 of FIG. 3a, but a color filter is not formed on the substrate 21 of FIG. 3b as one embodiment. However, a color filter may be formed on the substrate 21 of FIG. 3b. Also, elements not mentioned in FIGS. 3a and 3b have the same structures as those of FIG. 1.

Referring to FIG. 3a, when no electric voltage is applied, the uniaxial nematic liquid crystal molecules 31 are arranged to be parallel to the surfaces of the first and second substrates 11 and 21. Also, the longitudinal axes of the liquid crystal molecules 31 are arranged to be parallel to the transmission axis P of the lower polarizer 12. Accordingly, the light passing to the lower polarizer 12 is not retarded in phase due to the longitudinal axes of the liquid crystal molecules 31 that are arranged to be parallel to the transmission axis P of the lower polarizer 12. Accordingly, the polarized light is blocked by the upper polarizer 22 such that the pixel becomes black.

On the other hand, when an electric field is applied between the first electrode 13 and the second electrode 15, the electric field is substantially parallel to the surfaces of the first and second substrates 11 and 21. Accordingly, the longitudinal axes of the liquid crystal molecules 31 are rearranged to be parallel to the electric field such that the longitudinal axes of the liquid crystal molecules 31 respectively form an angle of 90-θ with the transmission axis of the lower polarizer 12 and the light passing the lower polarizer 12 generates the phase retardation. As a result, the pixel displays a white state and the light passes the upper polarizer 22 in the front and oblique directions.

Referring to FIG. 3b, when no electric field is applied, the uniaxial nematic liquid crystal molecules 31 are arranged to be parallel to the surfaces of the first and second substrates 11 and 21. Also, the longitudinal axes of the liquid crystal molecules 31 are arranged to be parallel to the transmission axis P of the lower polarizer 12. Accordingly, the light passing to the lower polarizer 12 is not retarded in phase due to the longitudinal axes of the liquid crystal molecules 31 that are arranged to be parallel to the transmission axis P of the lower polarizer 12. Accordingly, the polarized light is blocked by the upper polarizer 22 such that the pixel becomes black.

On the other hand, when an electric field is applied between the third electrode 14 and the fourth electrode 25, the electric field is formed substantially perpendicular to the surfaces of the first and second substrates 11 and 21. Accordingly, the longitudinal axes of the liquid crystal molecules 31 are rearranged to be parallel to the electric field. Therefore, the light passing the lower polarizer 12 is not retarded in phase due to the longitudinal axes. Accordingly, the light passing the lower polarizer 12 is blocked by the upper polarizer 22 in the front direction. However, the oblique light of the light obliquely passing the lower polarizer 12 forms the predetermined angle with the longitudinal axes of the liquid crystal molecules 31 such that the oblique light is retarded in phase. Accordingly, the light obliquely passing the lower polarizer 12 passes the upper polarizer 22 in the oblique direction in the assistance display region AA. As a result, the black state is displayed in the front direction and the white state is displayed in the oblique direction.

That is to say, the narrow viewing angle may be obtained upon the application of the electric voltage in the assistant display region AA. On the other hand, upon no application of the electric voltage in the assistance region AA, because the assistant display region AA becomes a completely black state, the image of the main display region MA is not distorted in the oblique direction. Therefore, the wide viewing angle may be obtained in the main display region MA.

A display device according to another embodiment of the present invention will be described in detail with reference to FIGS. 4 to 7.

Figure 4:
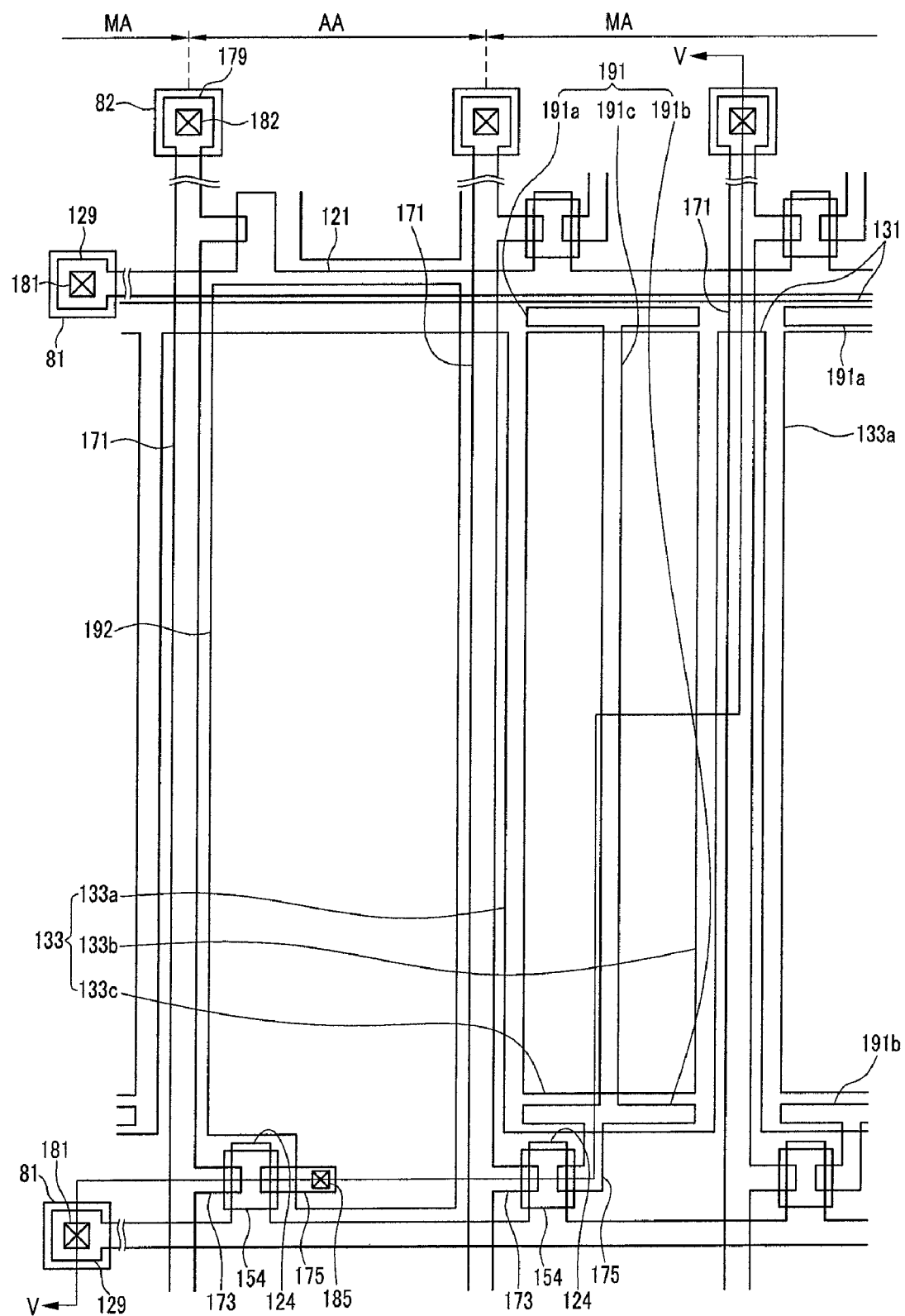
FIG. 4 is a layout view of a lower panel of a display device according to another embodiment of the present invention.
Figure 5:
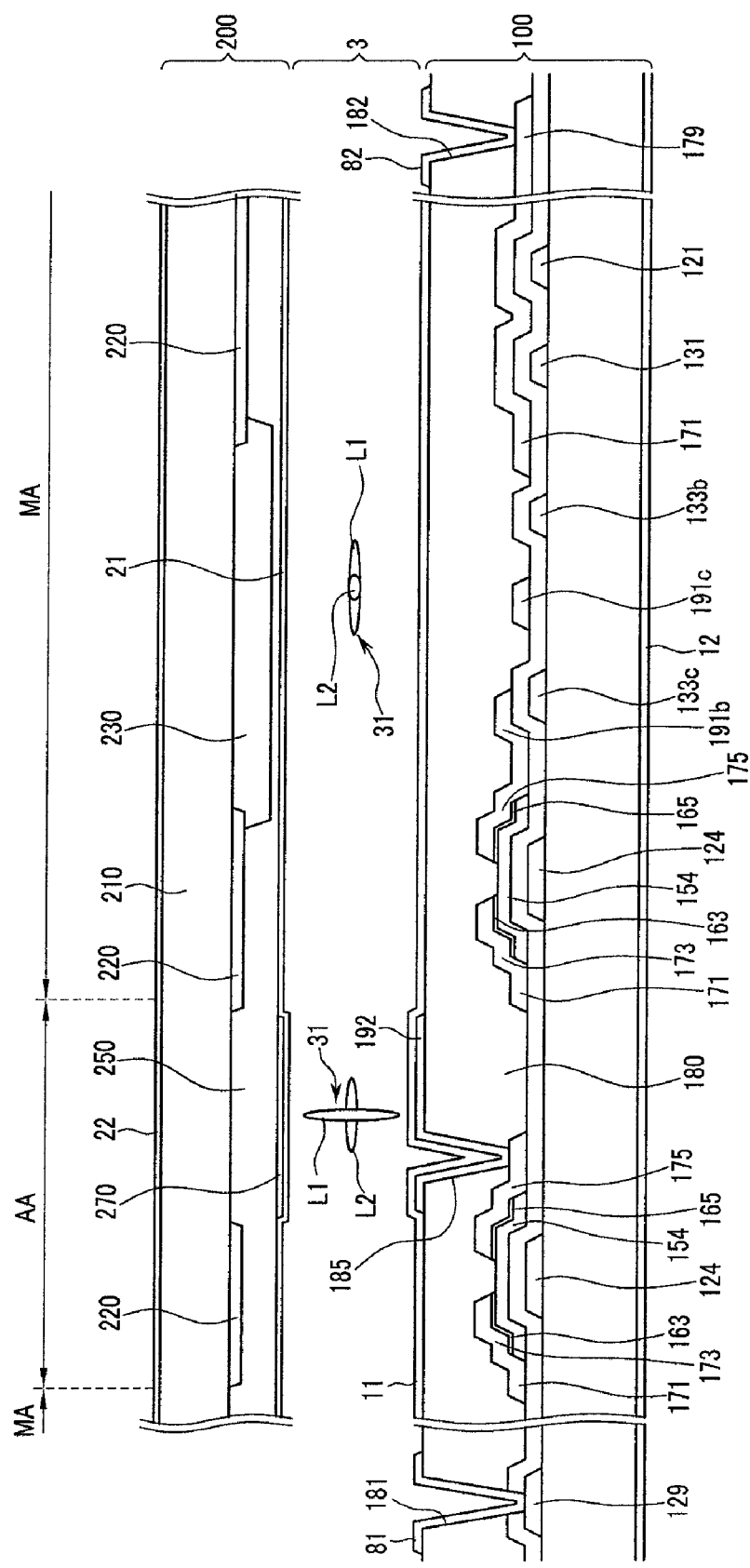
FIG. 5 is a sectional view of a display device including the lower panel shown in FIG. 4 and an upper panel, taken along the line V-V.
Figure 6:
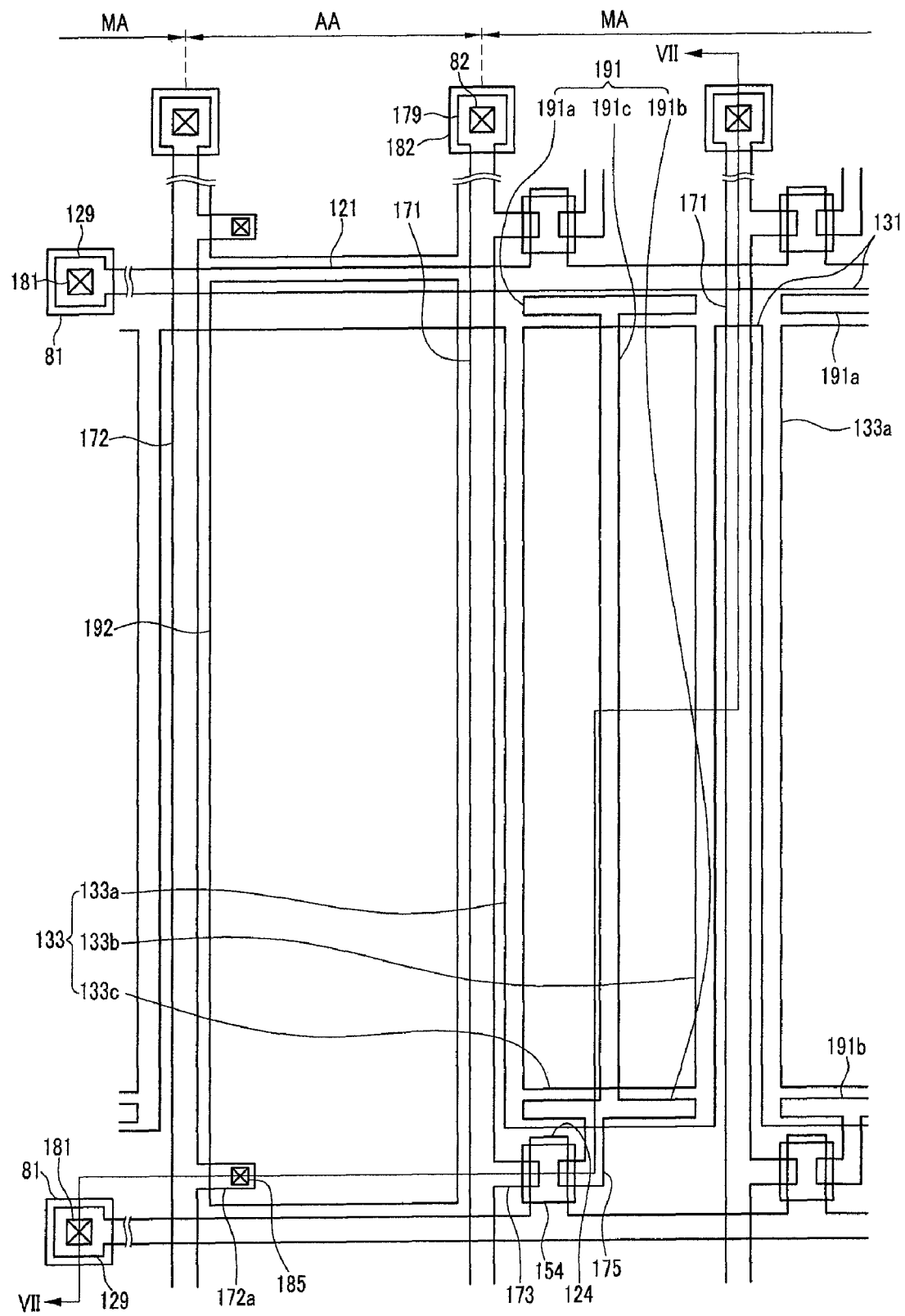
FIG. 6 is a layout view of a lower panel of a display device according to another embodiment of the present invention.
Figure 7:
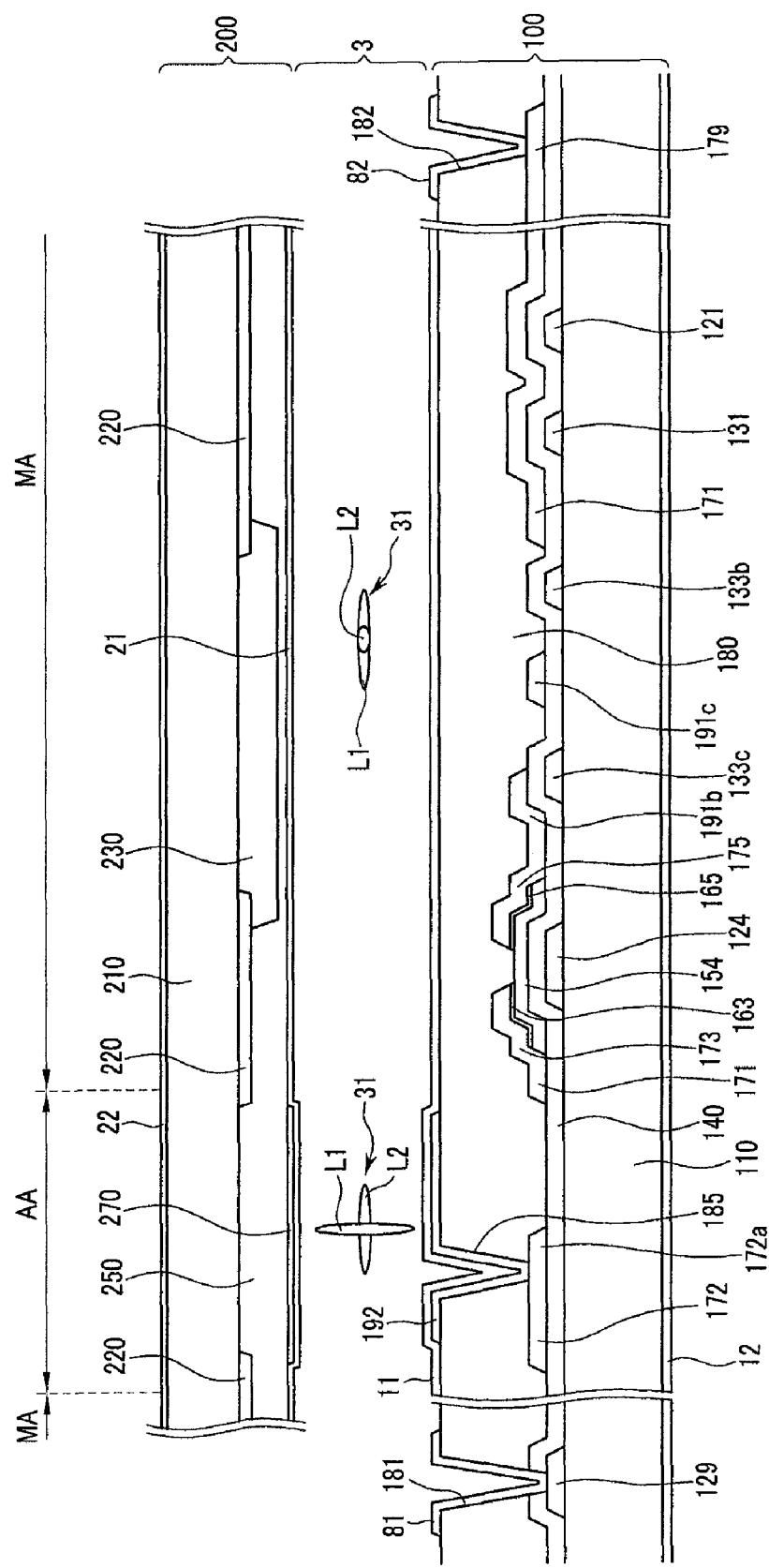
FIG. 7 is a sectional view of a display device including the lower panel shown in FIG. 6 and an upper panel, taken along the line VII-VII.

FIG. 4 is a layout view of a lower panel of a display device according to another embodiment of the present invention, FIG. 5 is a sectional view of a display device including the lower panel shown in FIG. 6 and an upper panel, taken along the line V-V, FIG. 6 is a layout view of a lower panel of a display device according to another embodiment of the present invention, and FIG. 7 is a sectional view of a display device including the lower panel shown in FIG. 6 and an upper panel, taken along the line VII-VII.

A display device according to this embodiment of the present invention includes a lower panel 100, an upper panel 200, and an LC layer 3 interposed between the panels 100 and 200.

The lower panel 100 will be now be described in detail.

A plurality of gate lines 121 and a plurality of common electrode lines 131 are formed on an insulating substrate 110 made of a material such as transparent glass.

The gate lines 121 extend substantially in a transverse direction and are separated from each other, and transmit gate signals. Each gate line 121 includes a plurality of projections forming a plurality of gate electrodes 124, and an end portion 129 having a large area for contact with another layer or an external driving circuit.

The common electrode lines 131 are supplied with a predetermined voltage, and include a stem portion extended substantially parallel to the gate lines 121, a plurality of longitudinal common electrodes 133a and 133b extended from the stem, and a plurality of transverse common electrodes 133c connecting one end of each of the longitudinal common electrodes 133a and 133b to each other. The common electrodes 133a to 133c are arranged in the pixel corresponding to the main display region MA in FIG. 1, and are not formed in the pixel corresponding to the assistant display region AA. It is preferable that one pixel corresponding to the assistance display region AA is arranged per the three pixels corresponding to the main display region MA (not shown in FIGS. 4 and 5). However, this is only one embodiment, and the compounding of the pixels may be variously changed.

A gate insulating layer 140 preferably made of silicon nitride (SiNx) is formed on the gate lines 121 and the storage electrode lines 131.

A plurality of semiconductor islands 154 preferably made of hydrogenated amorphous silicon (abbreviated to "a-Si") or polysilicon, and a plurality of ohmic contact islands 163 and 165 preferably made of silicide or n+ hydrogenated a-Si heavily doped with an n-type impurity such as phosphorous are sequentially formed on the gate insulating layer 140. Pairs of an ohmic contact 163 and an ohmic contact 165 are located on the semiconductors 154.

A plurality of data lines 171 and a plurality of drain electrodes 175 that are separated from the data lines 171 are formed on the ohmic contacts 163 and 165 and the gate insulating layer 140.

The data lines 171 for transmitting data voltages extend substantially in the longitudinal direction, crossing the gate lines 121 at right angles. Each data line 171 includes a plurality of source electrodes 173, which are extended toward the gate electrodes 124, and an end portion 179 having a large area for contact with another layer or an external device. The source electrodes 173 face the drain electrodes 175 with reference of the gate electrodes 124.

On the other hand, as shown in FIGS. 6 and 7, a lower panel 100 according to another embodiment of the present invention further includes a plurality of controlling viewing angle lines 172. The controlling viewing angle lines 172 for transmitting data voltages to the assistance display region AA extend substantially in the longitudinal direction and parallel to the data lines 171. Each of the controlling viewing angle lines 172 include a plurality of projections 172a extending in the assistant display region AA, and an end portion having a large area for contact with another layer or an external device, like the data lines 171.

A gate electrode 124, a source electrode 173, and a drain electrode 175 along with a semiconductor 154 form a TFT having a channel formed in the semiconductor 154 disposed between the source electrode 173 and the drain electrode 175.

The ohmic contacts 163 and 165 are interposed only between the underlying semiconductor stripes 151 and the overlying data lines 171 and the overlying drain electrodes 175 thereon, and reduce the contact resistance therebetween. The semiconductors 151 include a plurality of exposed portions, which are not covered with the data lines 171 and the drain electrodes 175, such as portions located between the source electrodes 173 and the drain electrodes 175.

Also, a plurality of pixel electrodes 191 and 192 are formed on the gate insulating layer 140. The pixel electrodes 191 and 192 are physically and electrically connected to the drain electrodes 175 such that the pixel electrodes 191 and 192 receive the data voltages from the drain electrodes 175. The structures of the pixel electrodes 191 and 192 are different in the main display region MA and the assistance display region AA. The pixel electrodes 191 of the main display region MA are formed with the same layer as the drain electrodes 175, and the pixel electrodes 192 of the assistance display region M are formed in a passivation layer 180.

The pixel electrodes 191 and 192 are preferably made of a transparent conductor such as ITO or IZO.

The pixel electrodes 191 of the main display region MA are disposed in the pixels enclosed by the gate lines 121 and the data lines 171, and are alternately arranged with the common electrodes 133a and 133b. The pixel electrodes 191 include transverse portions 191a and 191b parallel to the gate lines 121, and longitudinal portions 191c connecting the transverse portions 191a and 191b. The transverse portions 191a and 191b overlap the stems of the common electrode lines 131 and the transverse portions 133c of the common electrode lines 131 to form a storage capacitor, and are connected to the drain electrodes 175. The longitudinal portions 191c of the pixel electrodes 191 are parallel to the common electrodes 133a and 133b to form an electric field in the horizontal direction parallel to the surface of the substrate 110.

The pixel electrodes 192 of the assistance display region AA are disposed in the pixels enclosed by the gate lines 121 and the data lines 171. The pixel electrodes 192 of the assistance display region AA overlap the stem of the common electrode lines 131 and the whole area enclosed by the gate lines 121 and the data lines 171.

A passivation layer 180 is formed on the data lines 171, the drain electrodes 175, the pixel electrodes 191, and the exposed portions of the semiconductors 154. The passivation layer 180 is preferably made of an inorganic insulator such as silicon nitride or silicon oxide, a photosensitive organic material having a good flatness characteristic, or a low dielectric insulating material such as a-Si:C:O and a-Si:O:F formed by plasma enhanced chemical vapor deposition (PECVD). The passivation layer 180 may include a lower film of an inorganic insulator and an upper film of an organic insulator.

The passivation layer 180 has a plurality of contact holes 182 and 185 exposing the end portions 179 of the data lines 171, and the portions of the drain electrodes 175 in the assistance display region AA, respectively. The passivation layer 180 and the gate insulating layer 140 have a plurality of contact holes 181 exposing the end portions 129 of the gate lines 121

The pixel electrodes 192 are disposed on the passivation layer 180, and a lower alignment layer 11 for initially aligning the liquid crystal molecules is formed on the passivation layer 180 and the pixel electrodes 192. The pixel electrodes 192 are connected to the drain electrodes 175 through the contact holes 185 of the passivation layer 180.

Further, the pixel electrodes 192 are connected to the projections 172a of the controlling viewing angle lines 172 through the contact holes 185 such that the pixel electrodes 192 receive the signals from the controlling viewing angle lines 172.

Contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and complement the adhesion of the end portions 129 and 179 to external devices.

A description of the upper panel 200 follows with reference to the drawings.

A light blocking member 220 called a black matrix for preventing light leakage is formed on an insulating substrate 210, and a plurality of color filters 230 disposed substantially in the areas enclosed by the light blocking member 220 are formed thereon.

An overcoat 250 for preventing the color filters 230 from being exposed and for providing a flat surface is formed on the color filters 230 and the light blocking member 220, and a buffer electrode 270 only facing the pixel electrode 192 is formed on the overcoat 250. An upper alignment layer 22 for initially aligning the liquid crystal molecules thereon. In this embodiment, the color filters 230 are only formed in the main display region MA, and are not formed in the assistance display region AA. However, the color filters may also be formed in the assistance display region AA.

Polarizers 12 and 22 are provided on outer surfaces of the panels 100 and 200 such that their polarization axes are parallel or crossed. One of the polarizers 12 and 22 may be omitted.

An LC layer 3 having biaxial nematic liquid crystal molecules 31 are formed between two panels 100 and 200. A first major axis of first portions L1 and a second major axis of second portions L2 of the biaxial nematic liquid crystal molecules 31 are crossed. The first portions L1 and the second portions L2 of the biaxial nematic liquid crystal molecules 31 may have the same dielectric anisotropy.

In this embodiment, the first portions L1 and the second portions L2 of the liquid crystal molecules 31 are crossed, but the present invention is not limited by this embodiment, and the biaxial nematic liquid crystal molecules of various shapes may be used.

A driving method for a pixel for controlling viewing angle in the assistance display region AA for providing a narrow viewing angle in the display device according to an embodiment of the present invention will be described in detail with reference to FIG. 8.

Figure 8:
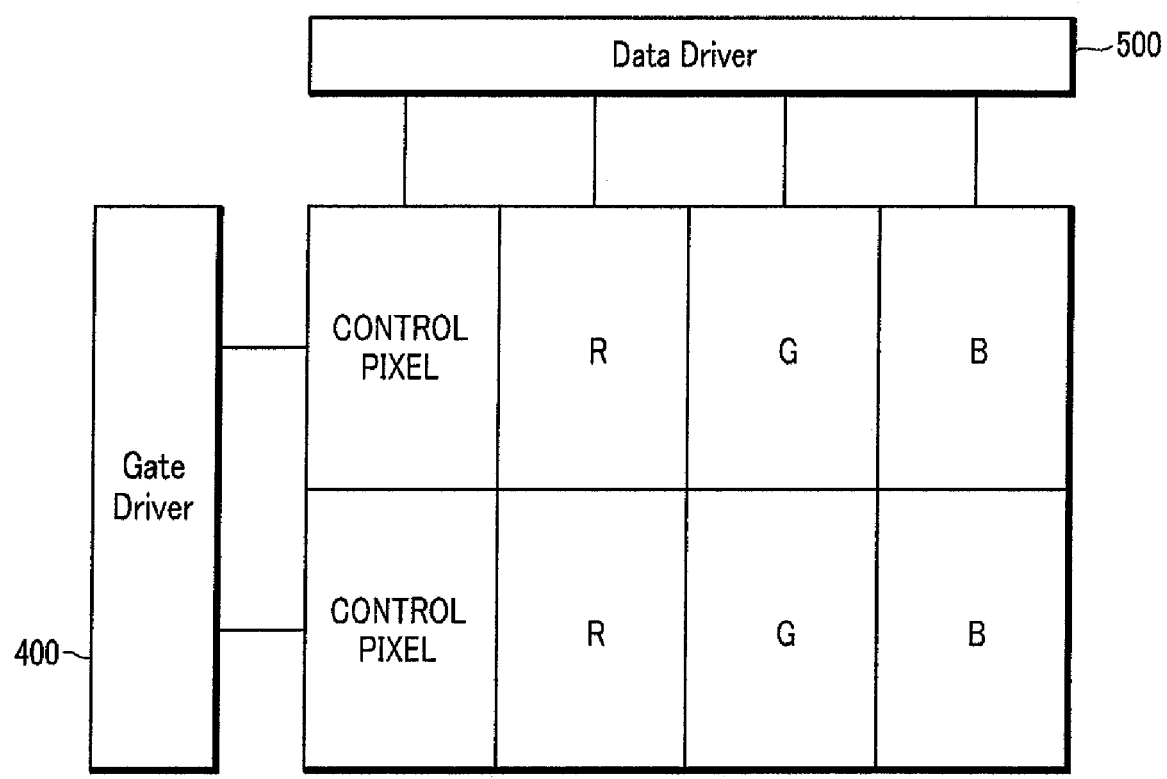
FIG. 8 is a schematic view of the display device including a gate driver and a data driver according to the present invention.

FIG. 8 is a schematic view of the display device including a gate driver and a data driver according to the present invention.

The gate lines 121 receive gate signals from a gate driver 400 connected to the end portions 129 of the gate lines 121, and the data lines 171 receive data signals from a data driver 500 connected to the end portions 179 of the data lines 171. The data lines 171 transmit the data signals to the pixel electrodes 191 of the main display region MA and the pixel electrodes 192 of the assistance display region AA.

The data driver 500, selectively controls the main display region MA having a plurality of color filters 230 such as red, green, and blue, and the assistance display region AA having a color filter of white or without a color filter. For a wide viewing angle, the assistance display region AA is off, and the assistance display region AA is on in the case of a narrow viewing angle. That is to say, the rotation of each of pixel in the assistance display region AA is determined by the data driver 500, such that the wide viewing angle and the narrow viewing angle may be selectively obtained.

Referring to FIGS. 6 and 7, the data lines 171 transmit the data signals to the pixel electrodes 191 of the main display region MA, but the controlling viewing angle lines 172 transmit the data signal to the pixel electrodes 192 of the assistance display region AA. The data lines 171 are connected to the data driver 500 and receive the data signal from the data driver 500, and the controlling viewing angle lines 172 are connected to an additional driver (not shown) and receive the data signal from the additional driver. However, the controlling viewing angle lines 172 may be directly connected to the data driver 500 such that the controlling viewing angle lines 172 may be controlled by the data driver 500.

As described above, because the display device includes the assistance display region transmitting the light in an oblique direction in a white state, the image of the wide viewing angle and the narrow viewing angle may be selectively obtained.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A display device, comprising:
a first substrate;
a second substrate facing the first substrate;
first to third electrodes formed on the first substrate;
a fourth electrode formed on the second substrate,
a liquid crystal layer formed between the first and second substrates;
a first polarizer formed on the surface of the first substrate; and
a second polarizer formed on the surface of the second substrate,
wherein the first and second substrates include a main display region and an assistance display region, and
wherein the first and the second electrodes form a horizontal electric field that is substantially parallel to the surfaces of the first and second insulating substrates, and the third and fourth electrodes form a vertical electric field that is substantially perpendicular to the surfaces of the first and second substrates,
wherein biaxial nematic liquid crystal molecules of the liquid crystal layer include a first major axis and a second portion having a second major axis, and
wherein the transmission axis of the first polarizer crosses the transmission axis of the second polarizer, and wherein the transmission axis of the first polarizer is parallel to the first major axis and the transmission axis of the second polarizer is parallel to the second major axis.

2. The display device of claim 1, wherein the transmission axis of the first polarizer forms an angle in a range of 0-90 degrees with the horizontal electric field.

3. The display device of claim 2, wherein the first portion has positive dielectric anisotropy, and the second portion has negative dielectric anisotropy.

4. The display device of claim 1, wherein the first and second electrodes are pixel electrodes, and the third and fourth electrodes are common electrodes, wherein the first and second electrodes are switched by thin film transistors.

5. The display device of claim 1, wherein the first and third electrodes are pixel electrodes, and the second and fourth electrodes are common electrodes, wherein the first electrode is switched by a thin film transistor and the third electrode is switched by a controlling viewing angle line.

6. A display device, comprising:

a first panel including field generating electrodes formed in a main display region and a first control electrode formed in an assistance display region;

a second panel including color filters facing the field generating electrodes and a second control electrode facing the first control electrode;

a liquid crystal layer formed between the first and second panels, a first polarizer formed on the surface of the first panel; and a second polarizer formed on the surface of the second panel, wherein the first and second control electrodes form an electric field that is perpendicular to the surface of the first and second panels, wherein biaxial nematic liquid crystal molecules of the liquid crystal layer include a first portion having a first major axis and a second portion having a second major axis that is perpendicular to the first major axis, wherein the liquid crystal molecules are initially aligned parallel to the surface of the first and second panels, wherein the transmission axis of the first polarizer crosses the transmission axis of the second polarizer, and wherein the transmission axis of the first polarizer is parallel to the first major axis and the transmission axis of the second polarizer is parallel to the second major axis.

7. The display device of claim 6, wherein the main display region includes at least three pixels having three primary colors, and the assistance display region includes at least one pair of a first and a second control electrode.

8. The display device of claim 6, wherein the first portion has positive dielectric anisotropy, and the second portion has negative dielectric anisotropy.

9. The display device of claim 6, wherein the first portion in the main display region is arranged to be parallel to the generated electric field, the second portion in the main display region is arranged to be perpendicular to the generated electric field, the first portion in the assistance display region is arranged to be perpendicular to the generated electric field, and the second portion in the assistance display region is arranged to be parallel to the transmission axis of the second polarizer.

* * * * *